No. 841,351. PATENTED JAN. 15, 1907.
W. J. SUMNER.
TROLLEY TRACK.
APPLICATION FILED SEPT. 12, 1906.

Witnesses:
H. L. Sprague.
H. W. Bown.

Inventor:
William J. Sumner,
by Chapin & Co.
Attorneys.

UNITED STATES PATENT OFFICE.

WILLIAM J. SUMNER, OF HOLYOKE, MASSACHUSETTS, ASSIGNOR TO COBURN TROLLEY TRACK CO., OF HOLYOKE, MASSACHUSETTS.

TROLLEY-TRACK.

No. 841,351.  Specification of Letters Patent.  Patented Jan. 15, 1907.

Application filed September 12, 1906. Serial No. 334,282.

*To all whom it may concern:*

Be it known that I, WILLIAM J. SUMNER, a citizen of the United States of America, residing at Holyoke, in the county of Hampden and State of Massachusetts, have invented new and useful Improvements in Trolley-Tracks, of which the following is a specification.

This invention relates to improvements in trolley-tracks of the kind used for supporting overhead trucks; and it has for a special object to provide a reinforced track construction for heavy service.

Figure 1:
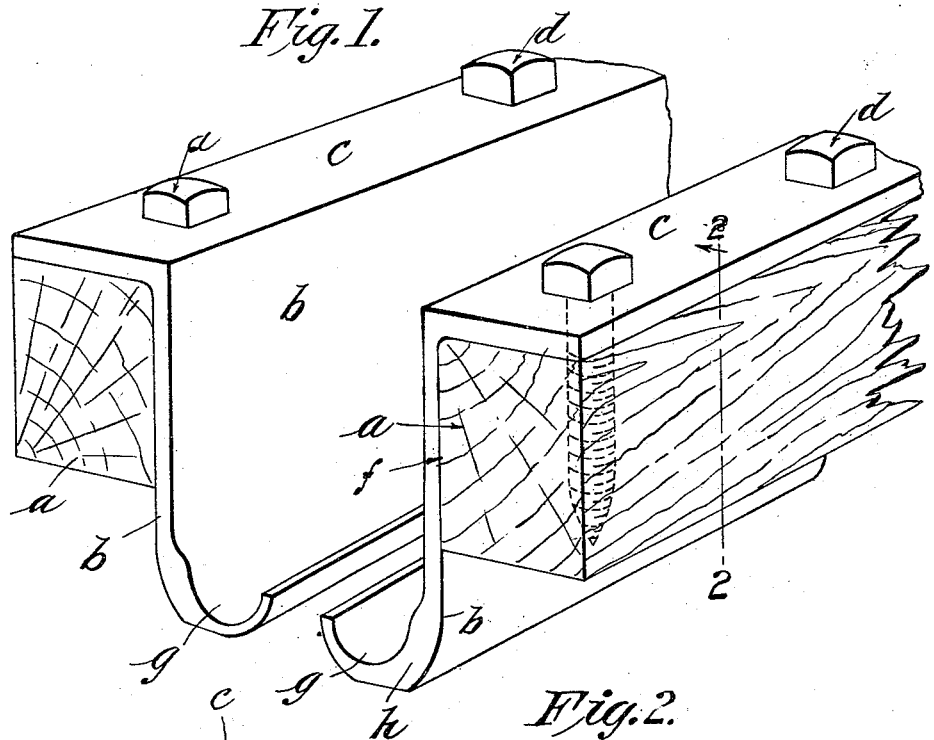
Figure 2:
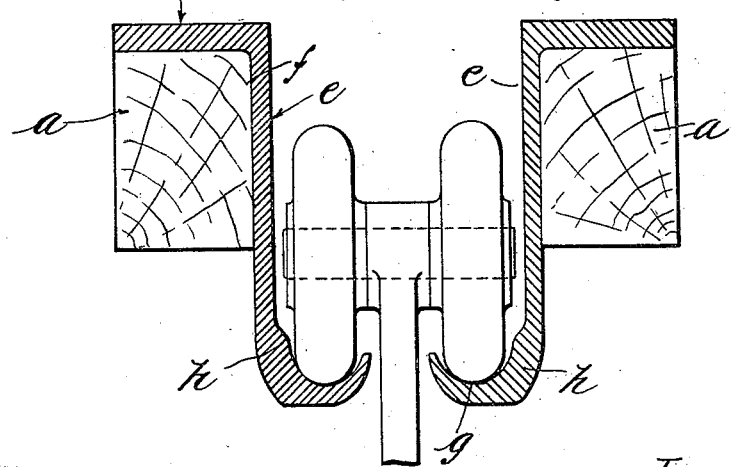

Broadly, the invention consists in providing the tread portion of the rail with a reinforced or strengthening part adjacent the tread portion and at the point where the web merges into the tread, the general shape of the rail in cross-section being that of the letter Z, the upper portion being the supporting part, the lower portion the part on which the supporting-wheels of the truck travel In the drawings forming a part of this application, with the reference characters marked thereon, Figure 1 is a perspective view of my improved trolley-rails assembled for use and showing the same secured to their supporting-timbers. Fig. 2 is a transverse sectional view on the line 2 2 of Fig. 1 and clearly showing the location and form of the reinforced portion of the rail.

Referring to the drawings in detail, *a* designates the supporting-timbers for the trolley-rails.

*b* designates the rails proper, that are made substantially Z-shaped in cross-sections.

*c* designates the horizontal portion of the rail, that is secured to the supporting-timbers *a* by means of the lag-bolts *d* or other suitable means.

The web of the rail, which is designated by the letter *e*, is placed against the vertical inner edge *f* of the supporting-timbers, as shown.

The tread portion of the rail is designated by the letter *g*. This portion of the rail is substantially circular in form; but the portion of the rail between the part designated *g* and the vertical web, which is designated at *e*, has a reinforcement or a thickened portion, as designated at *h*. The effect of increasing the amount of material at this point of the rail and adjacent the tread portion *g* thereof is to materially strengthen the track, so that it can be used for heavy service, and any liability or danger of the tracks becoming out of true or bent by a heavy load being placed on the truck is obviated. This thickened portion, which is the essential feature of this improvement, is made at the same time that the track is rolled or passed through the rolling-mill.

What I claim is—

1. In a track of the class described, a supporting portion and a tread portion, the supporting portion being above the tread portion, said portions being located at diagonally opposite parts of the rail, a thickened portion interposed between the tread and supporting portion, and the tread portion being substantially circular in form.

2. In a track of the class described, the same being substantially Z-shaped in cross-section, and comprising a supporting portion and a tread portion, the tread portion being substantially circular in form and a reinforcement of the rail in the part adjacent the tread portion thereof.

3. In a track of the class described, the same being substantially Z-shaped in cross-section, and comprising a supporting portion and a tread portion, the tread portion being substantially circular in form, and a reinforcement of the rail in the part adjacent the tread portion thereof, said reinforcement being located on the exterior side of the rail and at the point where the web portion merges into the tread portion.

4. A trolley-track having supporting and tread portions, the supporting portion being above the tread portions, a web connecting the same and including a thickened portion at the point where the web and tread portions merge into each other.

5. A trolley-track having a supporting portion and a tread portion extending in opposite directions, the same being connected by a vertical web, the section of the tread portion being substantially circular in form.

WILLIAM J. SUMNER.

Witnesses:
H. W. BOWEN,
K. I. CLEMONS.